(12) United States Patent
Hwang et al.

(10) Patent No.: US 10,748,561 B1
(45) Date of Patent: Aug. 18, 2020

(54) MAGNETIC RECORDING DISK DRIVE WITH A CONTACT PAD FOR PROTECTION OF THE WRITE HEAD AND PROCESS FOR MAKING THE PAD

(71) Applicant: Western Digital Technologies, Inc., San Jose, CA (US)

(72) Inventors: Cherngye Hwang, San Jose, CA (US); Randall George Simmons, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/702,797

(22) Filed: Dec. 4, 2019

(51) Int. Cl.
G11B 5/31 (2006.01)
G11B 5/48 (2006.01)
G11B 5/00 (2006.01)

(52) U.S. Cl.
CPC .......... G11B 5/3106 (2013.01); G11B 5/4826 (2013.01); *G11B 2005/0021* (2013.01)

(58) Field of Classification Search
CPC ................ G11B 5/3103; G11B 5/4826; G11B 2005/0021
USPC ............................................. 360/234–234.6
See application file for complete search history.

(56) References Cited

U.S. PATENT DOCUMENTS

| | | | |
|---|---|---|---|
| 7,042,810 B2 | 5/2006 | Akiyama et al. | |
| 8,335,053 B2 | 12/2012 | Chen et al. | |
| 8,477,572 B1 | 7/2013 | Sahoo et al. | |
| 8,749,920 B1 | 6/2014 | Knutson et al. | |
| 8,861,317 B1 | 10/2014 | Yan et al. | |
| 8,902,720 B1 | 12/2014 | Schreck et al. | |
| 9,324,351 B2 | 4/2016 | Kong et al. | |
| 9,343,098 B1 | 5/2016 | He et al. | |
| 10,083,713 B1 | 9/2018 | Simmons et al. | |
| 2004/0021980 A1* | 2/2004 | Albrecht .............. | G11B 5/6005 360/99.21 |
| 2018/0040341 A1 | 2/2018 | Rejda et al. | |

* cited by examiner

*Primary Examiner* — Allen T Cao
(74) *Attorney, Agent, or Firm* — Thomas R. Berthold

(57) ABSTRACT

A magnetic recording disk drive head carrier or slider has a contact pad that protects the disk drive's write pole during touchdown of the slider with the disk. The contact pad is located in a window region of the slider's disk-facing surface that includes the write pole end. The contact pad includes a layer of silicon that surrounds the write pole end but does not cover it. The silicon does not cover the write pole end because it has diffused into the ferromagnetic material of the write pole end. This removes the silicon over the write pole end. The contact pad includes a protective overcoat on the silicon-containing write pole end and surrounding silicon layer. The protective overcoat thus has a recess over the write pole due to the absence of silicon, so that the protective overcoat surrounding the recess provides protection to the recessed write pole end during touchdown.

18 Claims, 8 Drawing Sheets

MAGNETIC RECORDING DISK DRIVE WITH A CONTACT PAD FOR PROTECTION OF THE WRITE HEAD AND PROCESS FOR MAKING THE PAD

TECHNICAL FIELD

This invention relates to magnetic recording hard disk drives (HDDs) that have a fly-height actuator for controlling the spacing between the write head and the disk, and more particularly to such disk drives that have a contact pad for protecting the write head's write pole during head-disk contact or "touchdown".

BACKGROUND

Magnetic recording hard disk drives use read and write transducers or heads mounted on a head carrier for reading and writing data to the disk. The head carrier is typically a gas-bearing slider attached to an actuator arm by a suspension and positioned very close to the disk surface by the suspension. There is typically a stack of disks in the disk drive with a slider-suspension assembly associated with each disk surface in the stack.

The separation or spacing between the slider and the disk surface is called the fly height. The slider has a disk-facing gas-bearing surface (GBS) that causes the slider to ride on a cushion or bearing of gas, typically air or helium, generated by rotation of the disk. The slider is attached to a flexure on the suspension and the suspension includes a load beam that applies a load force to the slider to counteract the gas-bearing force while permitting the slider to "pitch" and "roll". The flying dynamics of the slider and thus the fly height are influenced by factors such as the rotation speed of the disk, the aerodynamic shape of the slider's GBS, the load force applied to the slider by the suspension, and the pitch and roll torques applied to the slider by the suspension.

Disk drives with thermal fly-height control (TFC) of the read and write heads have been proposed. One type of TFC uses an electrically-resistive heater located on the slider near the write head. When current is applied to the heater, the heater expands and causes the write head's write pole to expand and thus move closer to the disk surface. The write pole can be adjusted to different heights, depending on whether the drive is reading or writing. Also, the heater can maintain the write pole at the optimal fly-height even in the presence of the above-described factors, which would otherwise cause changes in the fly-height. The TFC heater must be accurately calibrated so that the head-disk spacing can be controlled. The calibration requires that the value of heater power that results in onset of head-disk contact or "touchdown" be known. This touchdown is intentional and may be performed on each drive during initial drive calibration, or periodically during normal operation. An embedded contact sensor (ECS), embedded in the slider near the write head, can be used to sense touchdown. The ECS comprises a metallic strip located at the slider GBS. The resistance of the ECS changes in response to temperature changes so the voltage across the ECS can be used to determine touchdown, when the slider temperature changes as it comes in close proximity to the disk.

TFC heater calibration using touchdown is required for conventional perpendicular magnetic recording (PMR) disk drives as well as for proposed heat-assisted magnetic recording (HAMR) disk drives and microwave-assisted magnetic recording (MAMR) disk drives. In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording layer, located a subwavelength distance from the first element. The slider supports the NFT and the write pole, with the NFT and write pole having ends located at the surface of the slider that faces the recording layer. A protective slider overcoat is formed on the recording-layer-facing surface over the NFT and write pole ends and serves as the GBS.

SUMMARY

The requirement for touchdown in HDDs with TFC means that the write pole must be protected to prevent damage during touchdown. This is accomplished by providing a touchdown pad or contact pad on the slider covering the write pole. Contact pads can be difficult to pattern on the slider's disk-facing surface because of the very small dimensions, which make alignment of photoresist difficult. Also, additional protective layers covering the write pole will result in spacing loss between the write pole and the recording layer on the disk.

Embodiments of this invention relate to a slider with a contact pad in a window region that includes the write pole end. The contact pad includes a layer of silicon that surrounds the write pole end but does not cover it. The write pole end is formed of the write pole ferromagnetic material and silicon, which reduces the magnetic moment of the write pole end. The silicon-containing write pole end is formed when the silicon is deposited because the silicon diffuses into the write pole material, which removes the silicon that was deposited over the write pole end. The contact pad includes a protective overcoat formed over the write pole end and over the silicon layer surrounding the write pole end. The contact pad protective overcoat thus has a recess over the write pole, so that the protective overcoat surrounding the recess provides protection to the recessed write pole end during touchdown. A protective overcoat is provided in the non-window region of the slider's disk-facing surface. The outer surface of the contact pad's overcoat may extend slightly beyond the outer surface of the overcoat in the non-window region.

For a fuller understanding of the nature and advantages of the present invention, reference should be made to the following detailed description taken together with the accompanying figures.

DETAILED DESCRIPTION

Embodiments of the invention will be described for a HAMR disk drive. However, the invention is fully applicable to conventional PMR disk drives that use a write pole and trailing shield wherein the write field is generated in the write gap between the write pole and trailing shield, as well as to variations of PMR wherein electrically conductive material is located in the write gap, like in a MAMR disk drive.

Figure 1:
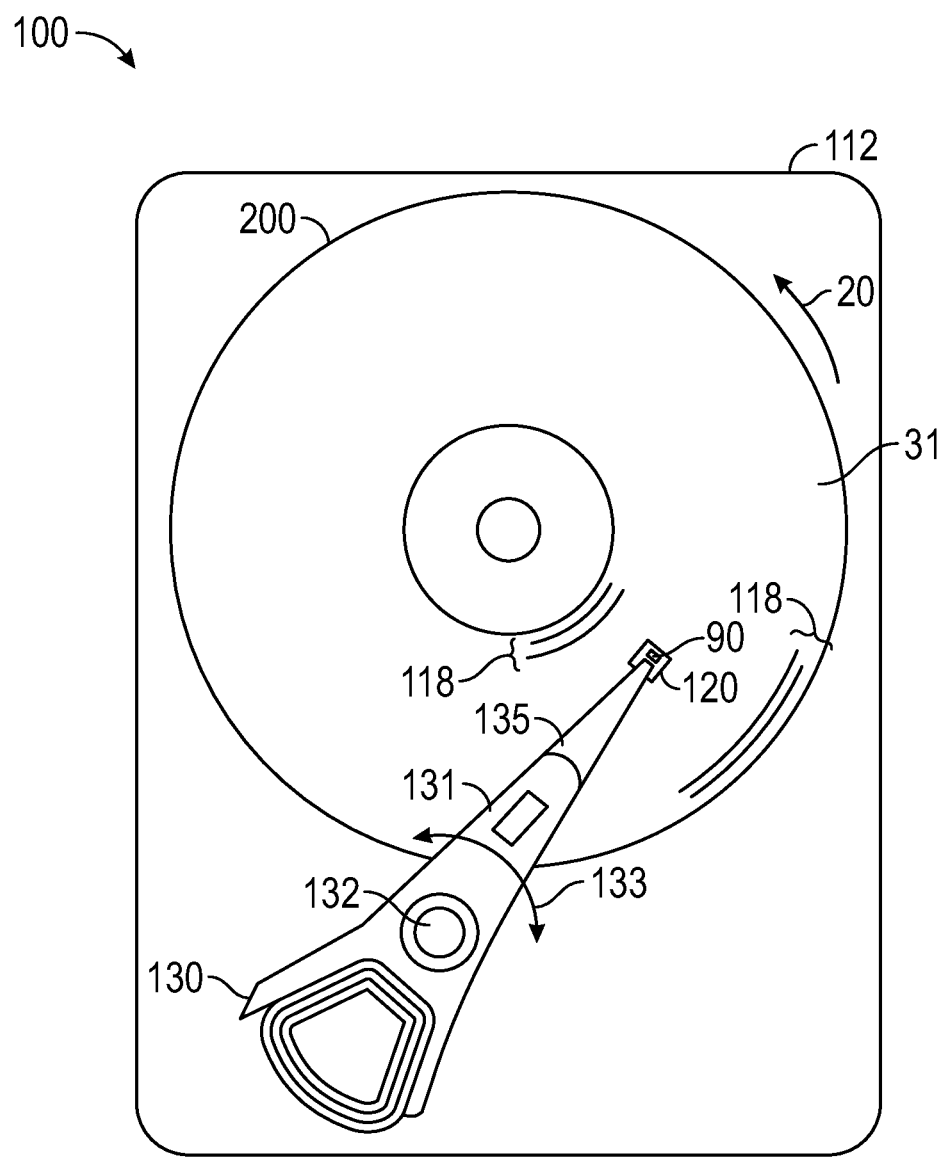
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor (not shown) for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
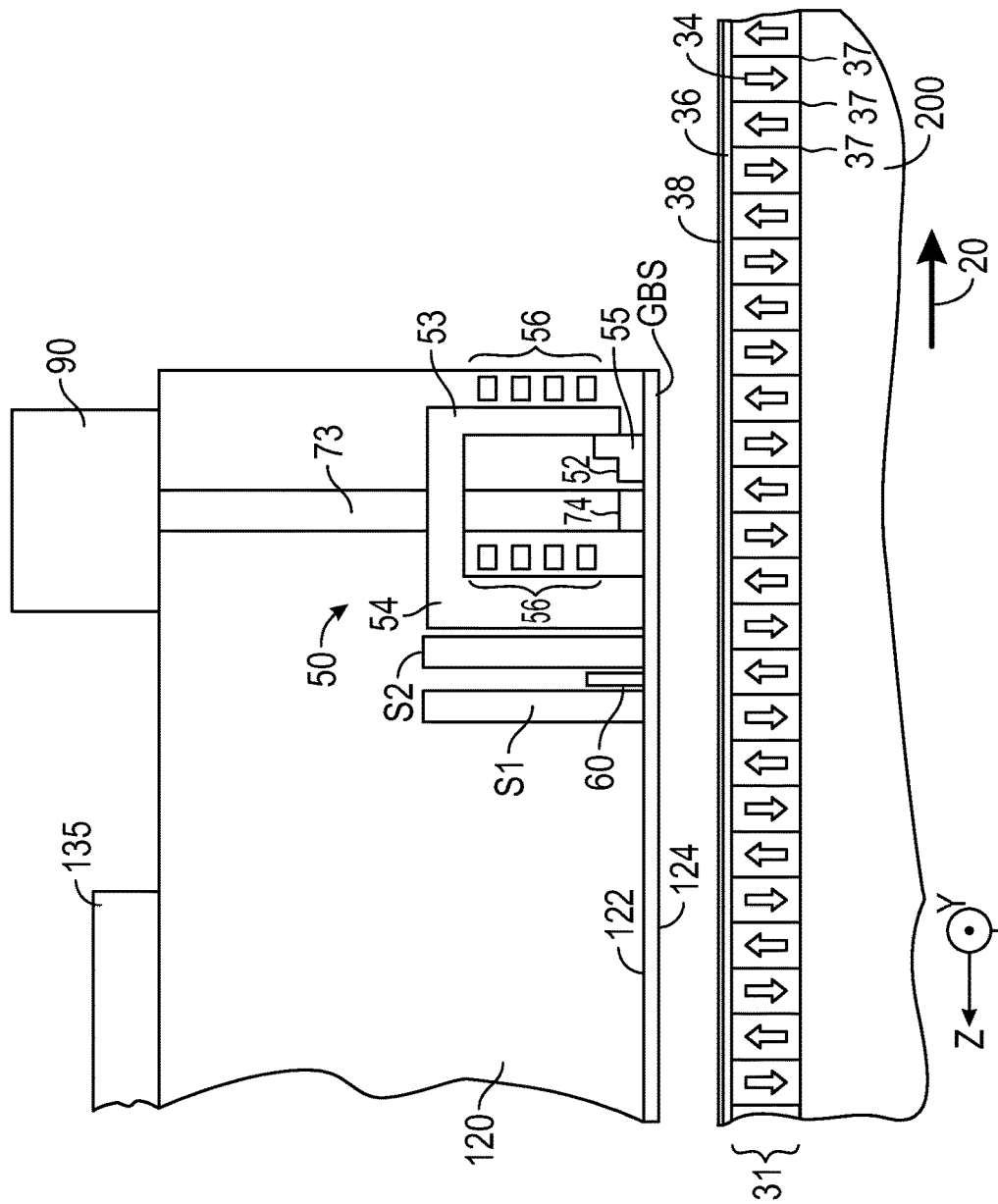
FIG. 2 depicts a sectional view, not drawn to scale because of the difficulty in showing the very small features, of an air-bearing slider for use in HAMR disk drive and a portion of a HAMR disk according to the prior art.

In the following drawings, the X direction denotes a direction perpendicular to the air-bearing surface (GBS) of the slider, the Y direction denotes a track width or cross-track direction, and the Z direction denotes an along-the-track direction. FIG. 2 is a schematic cross-sectional view illustrating a configuration example of a HAMR head according to the prior art, which is also capable of functioning as the HAMR head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The gas-bearing slider 120 is supported by suspension 135. The slider 120 has a recording-layer-facing surface 122 onto which a protective overcoat 124 is deposited. The overcoat 124 is typically a DLC overcoat whose outer surface forms the GBS of the slider 120. An optional adhesion undercoat (not shown), such as a silicon nitride (SiNx) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52. A semiconductor laser 90 is mounted to the top surface of slider 120. An optical waveguide 73 for guiding light from laser 90 to the NFT 74 is formed inside the slider 120.

Figure 3A:
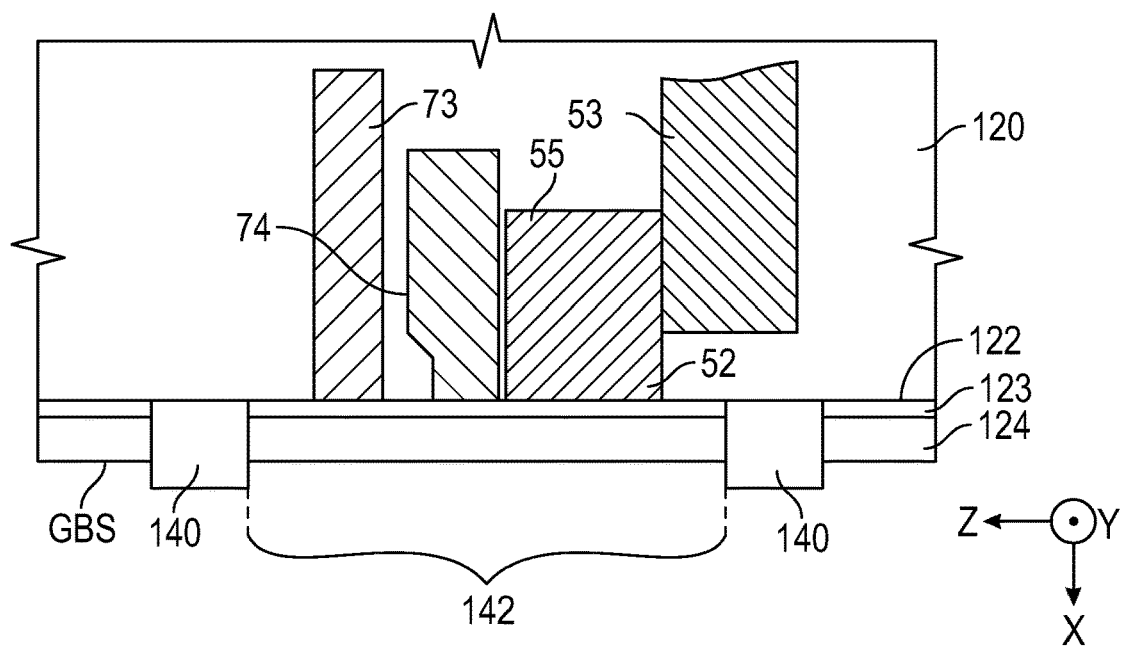
FIG. 3A is a cross-sectional view, not drawn to scale, of a portion of the slider and FIG. 3B, not drawn to scale, is a gas-bearing surface (GBS) view of the slider with the contact pad surrounding a window region of the GBS according to the prior art, wherein the near-field transducer (NFT) is a "nanobeak" type NFT with a triangular end with an apex of the triangle forming the NFT tip that faces the write pole end.
Figure 3B:
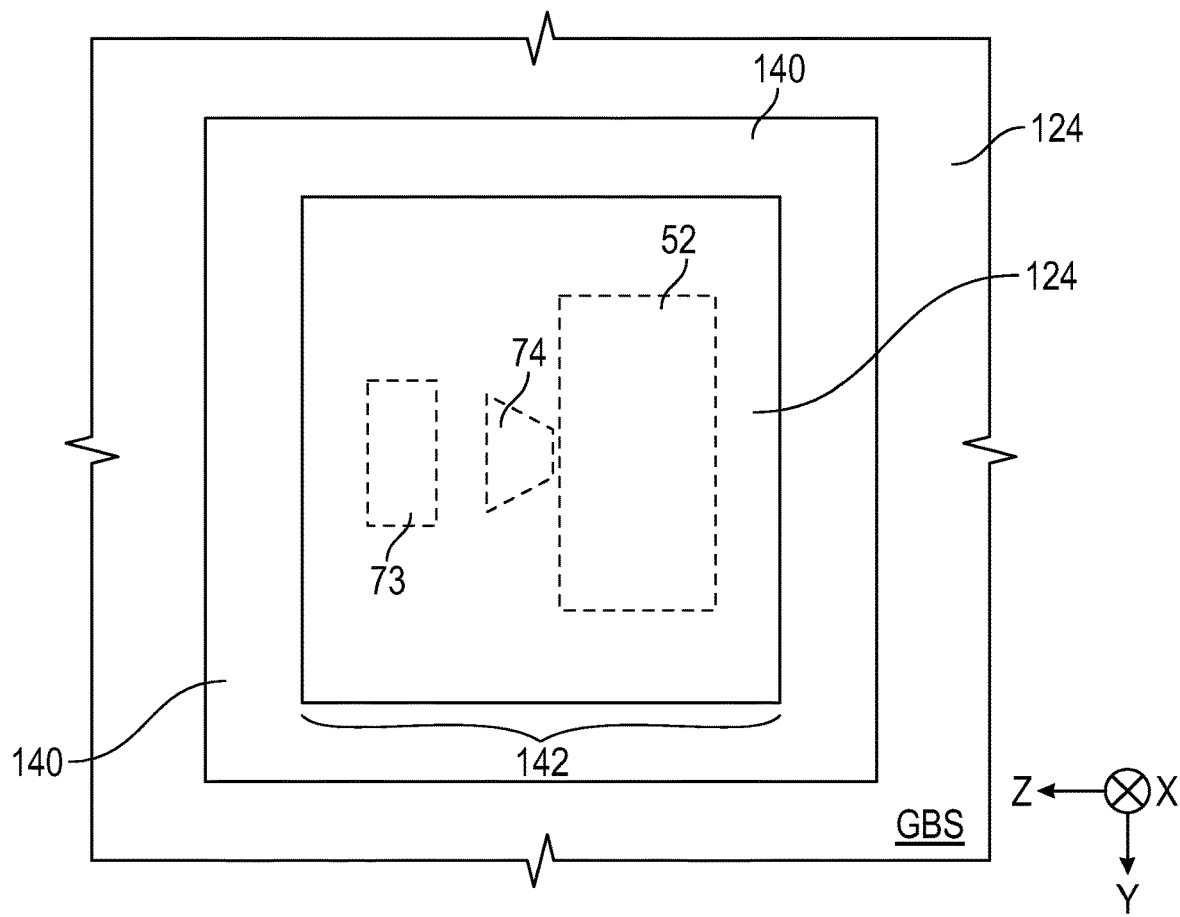

FIG. 3A is a cross-sectional view of a portion of the slider and FIG. 3B is a gas-bearing surface (GB S) view of the slider with the contact pad surrounding a window region of the GBS according to the prior art. The NFT 74 is a "nanobeak" type NFT with a triangular end with an apex of the triangle forming the NFT tip that faces the write pole end 52. In this type of NFT, the waveguide 73 has a surface that faces a surface of NFT 74. When light is introduced into the waveguide 73, an evanescent wave is generated at the surface and couples to surface plasmons excited on the surface of NFT 74. A contact pad 140, typically formed of a material like Cr, Ru or Ir, surrounds a window region 142 of the GBS. The window region 142 includes the write pole end 52, the end of NFT 74, and the end of waveguide 73. The outer surface of contact pad 140 extends beyond the GBS to protect the write pole end 52 during touchdown.

The contact pad 140 is formed by first depositing the optional adhesion film 123 on the disk-facing surface 122 and the protective overcoat 124 on the adhesion film 123 over the entire surface. A photoresist is then patterned and developed to expose the opening in the GBS that defines the contact pad 140. Contact material, like Cr, is then deposited to form the contact pad 140 to the desired thickness, after which the photoresist is removed. The problem with this method is that due to the very small dimensions it is very difficult to align the photoresist mask to cover just the write pole end 52. The mask must be made relatively large, which is why the window region 142 also includes the end of NFT 74 and the end of waveguide 73.

Figure 4A:
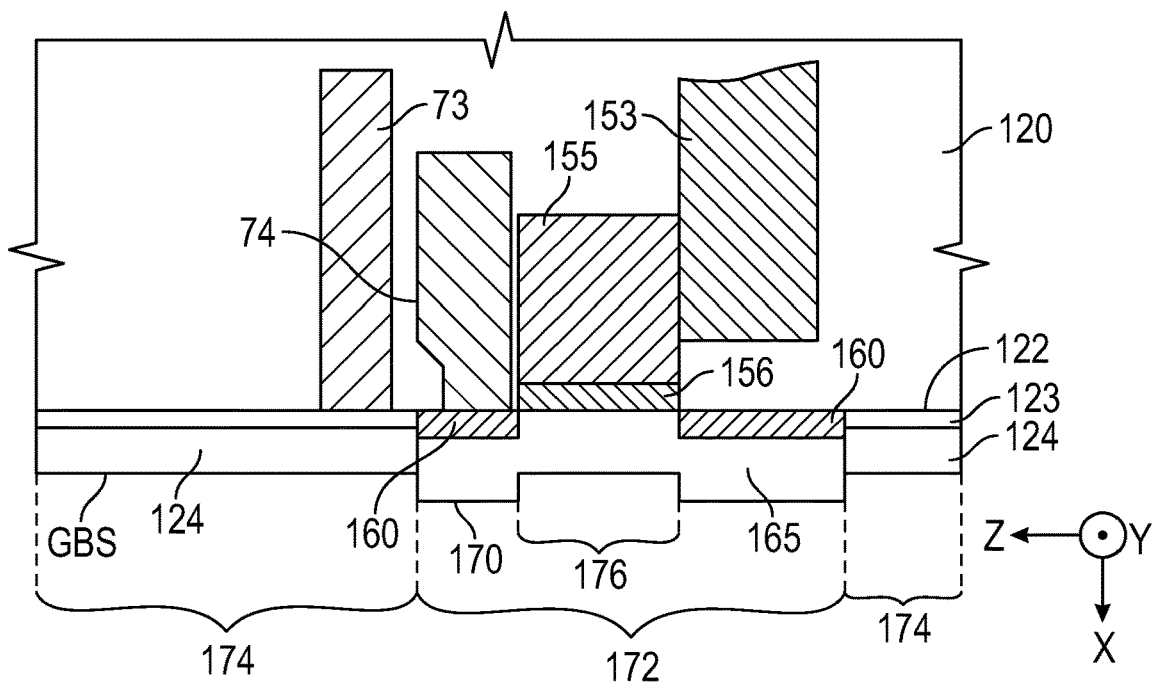
FIG. 4A is a cross-sectional view, not drawn to scale, of a portion of the slider and FIG. 4B, not drawn to scale, is a GBS view of the slider showing the contact pad with the recessed write pole end on the disk-facing surface of the slider according to an embodiment of the invention.
Figure 4B:
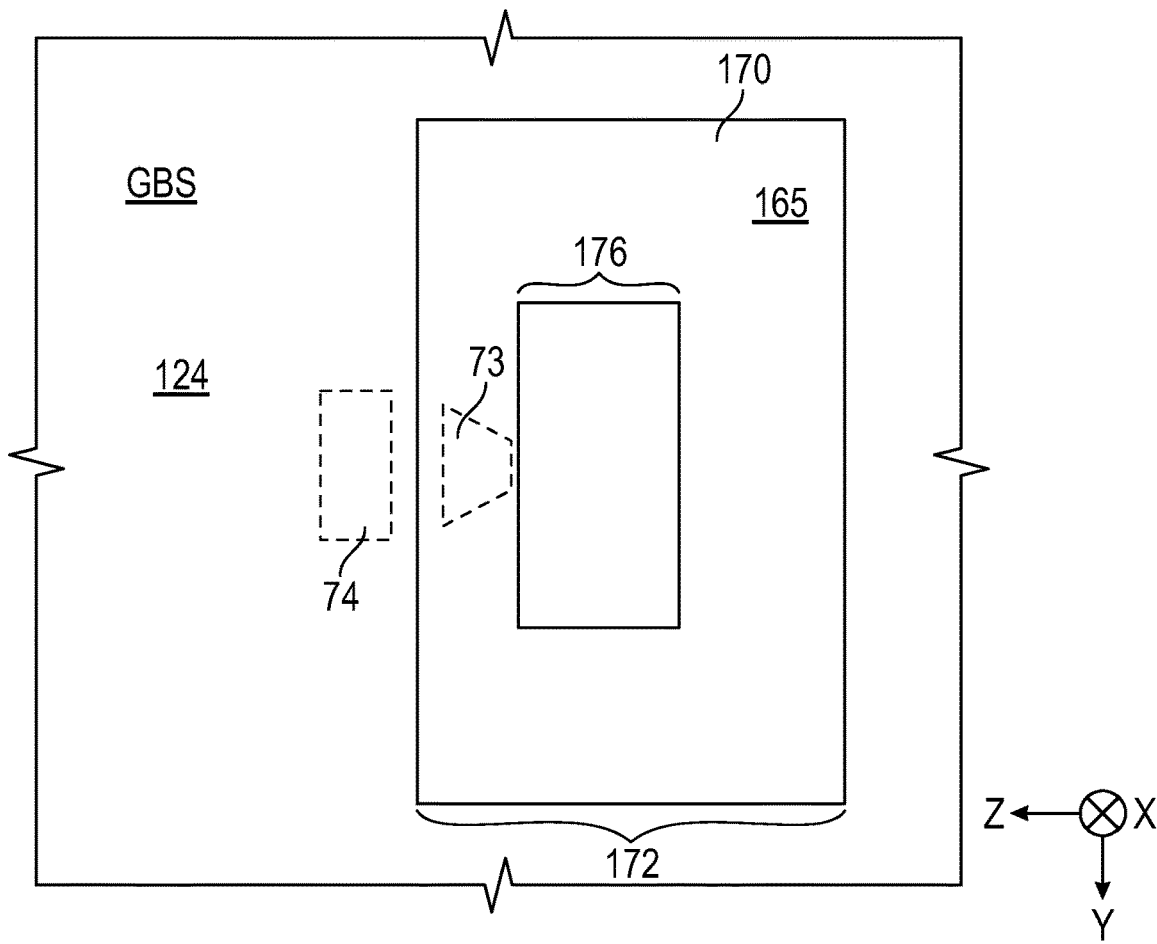

FIG. 4A is a cross-sectional view of a portion of the slider and FIG. 4B is a GBS view of the slider showing the contact pad with the recessed write pole end on the disk-facing surface of the slider according to an embodiment of the invention. A contact pad 170 is located in a window region 172 of the disk-facing surface 122. The window region 172 surrounds the end 156 of write pole 155 in addition to the end of NFT 74. The write pole 155 is formed of ferromagnetic material, typically an alloy of one or more of Co, Fe and Ni, like a high-moment CoFe alloy. The write pole 155 has an end 156 that is formed of ferromagnetic material and silicon. The silicon is diffused into the ferromagnetic material, so that the end 156 has a reduced magnetic moment. The contact pad 170 includes a silicon layer 160 that surrounds the write pole end 156 but does not cover it, and a protective layer 165, typically diamond-like carbon (DLC), on the silicon layer 160 and write pole end 156. In the non-window region 174 an optional adhesion film 123, like a silicon nitride (SiNx), is formed on the disk-facing surface 122 and a protective layer 124, like DLC, is formed on the adhesion film 123. The outer surface of contact pad 170 in the window region 172 extends beyond the outer surface the protective layer 124 in the non-window region 174, typically by about 0.5 to 1.0 nm, and includes a recessed portion 176 that is in contact with the silicon-containing write pole end 156. The depth of the recession 176 is substantially the same as the thickness of the deposited silicon layer 160. The write pole 155 will typically have a cross-track width along the Y-axis of about 1-2 microns, while the cross-track width of the contact pad 170 may be between about 70-100 microns. This relatively wide width allows a relatively low contact pressure during touchdown, which minimizes wear to the contact pad.

Figure 5A:
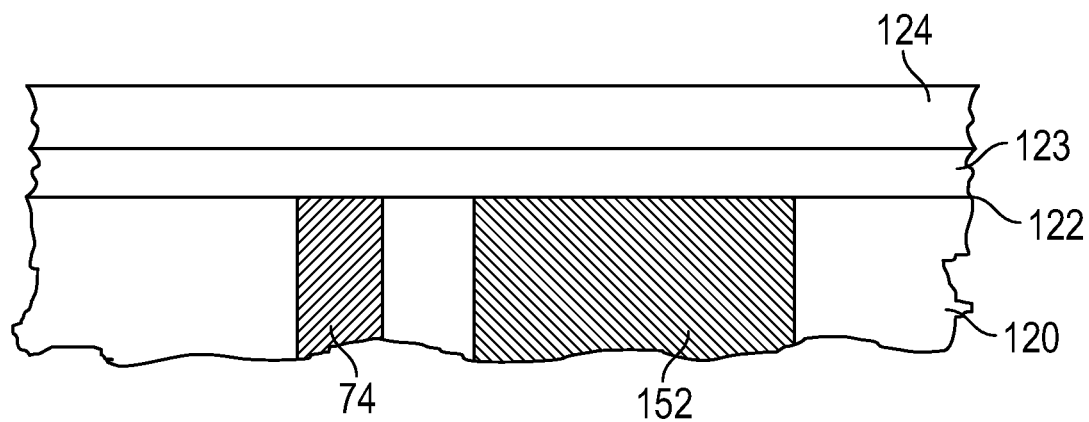
FIGS. 5A-5G, not drawn to scale, are sectional views illustrating the basic process steps in forming the contact pad with recessed write pole end according to an embodiment of the invention.
Figure 5B:
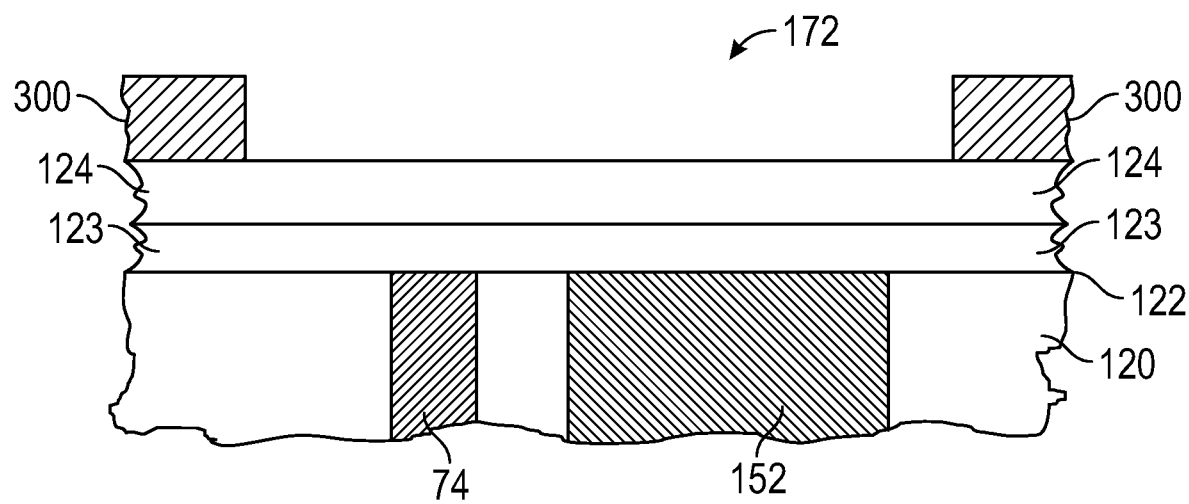
Figure 5C:
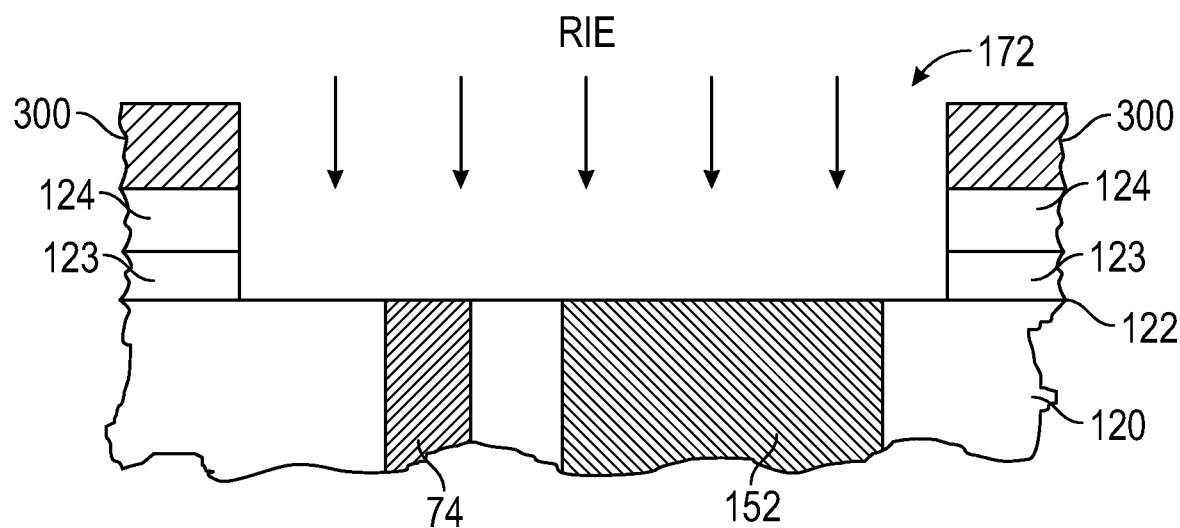
Figure 5D:
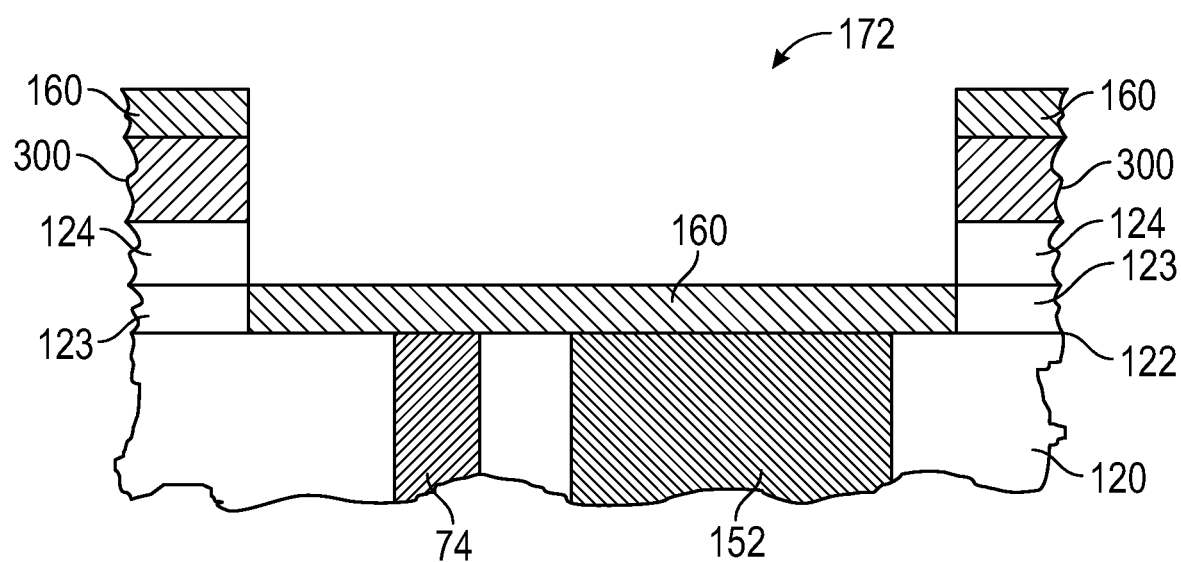
Figure 5E:
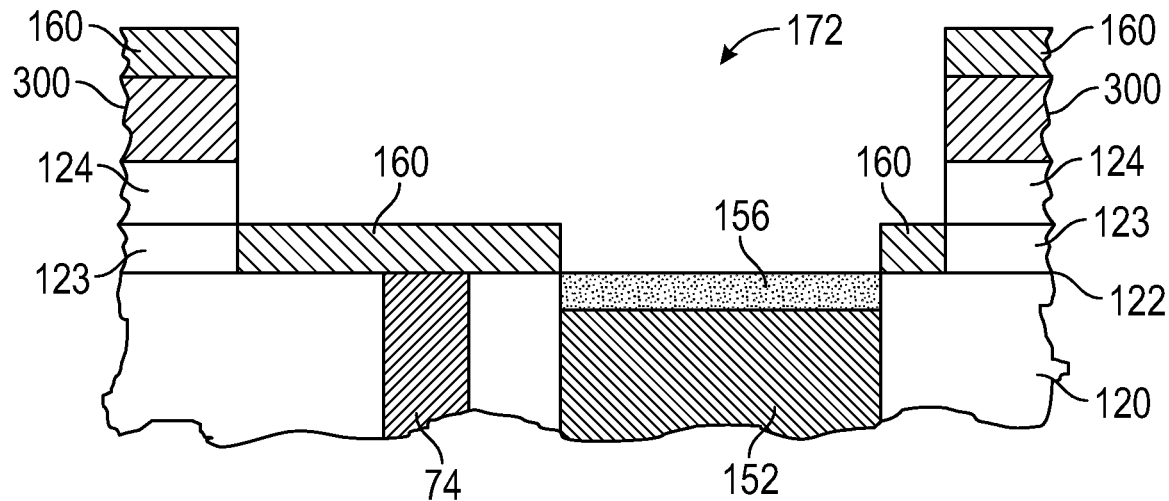

FIGS. 5A-5G are sectional views illustrating the basic process steps in forming the contact pad with recessed write pole end depicted in FIGS. 4A-4B. In FIG. 5A, a SiNx adhesion film 123 and an amorphous DLC protective layer or overcoat 124 have been deposited over the entire surface 122 of slider 120 to cover the end of NFT 74 and the end of write pole 152. The adhesion film 123 may have a thickness between about 1 and 5 Å and the DLC overcoat 124 may have a thickness between about 10 and 20 Å. In FIG. 5B, a resist 300 has been patterned and developed on overcoat 124 to define the window region 172. The resist may be a liquid resist deposited by spin-coating. In FIG. 5C the adhesion film 123 and slider overcoat 124 in window region 172 are removed, for example by reactive ion etching (RIE) in an Ar—N$_2$ or Ar—O$_2$ atmosphere. Because the etch rates of the adhesion film 123 and overcoat 124 material are well known, the etching can be terminated at the precise time to remove the overcoat 124 material and all of the adhesion film 123 without etching any of the NFT 74 material (typically Au or a Au alloy) or write pole 152 material (typically CoFe or CoFeNi alloy). In FIG. 5D, a layer 160 of silicon has been deposited in the window region 172. The silicon layer 160 may have a thickness preferably in the range of about 0.2 to 2.0 nm. In FIG. 5E, the silicon covering the write pole 152 has diffused into the write pole to form write pole end 156. The diffusion of the silicon into the write pole 152 removes the silicon that was in contact with the write pole 152 and causes a recess in the silicon layer 160.

Figure 5F:
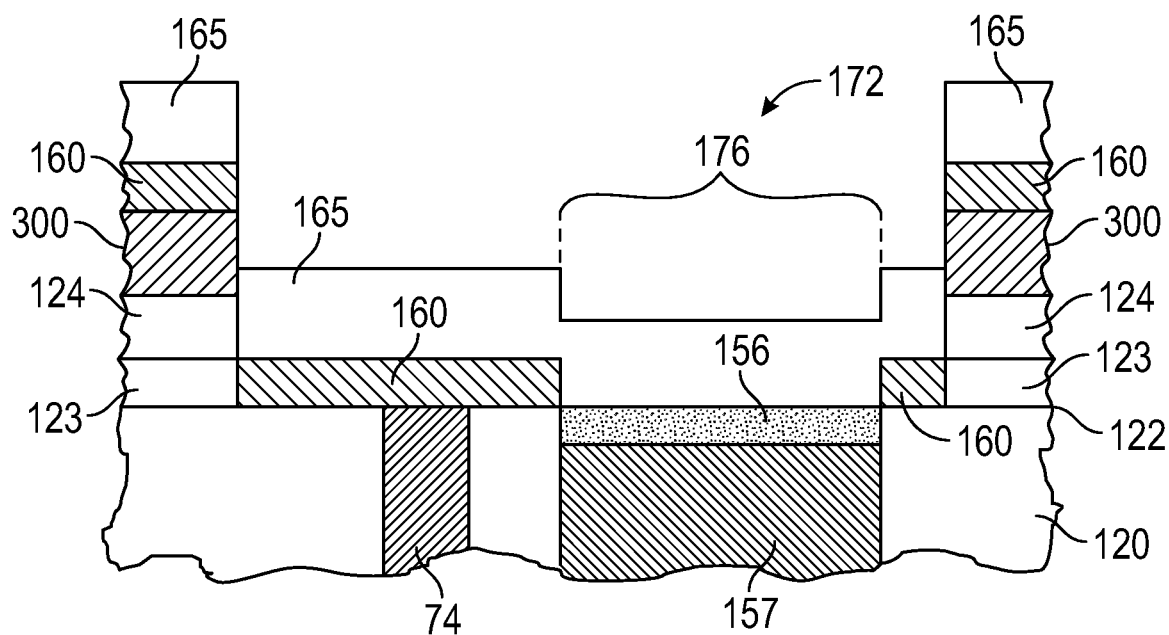
Figure 5G:
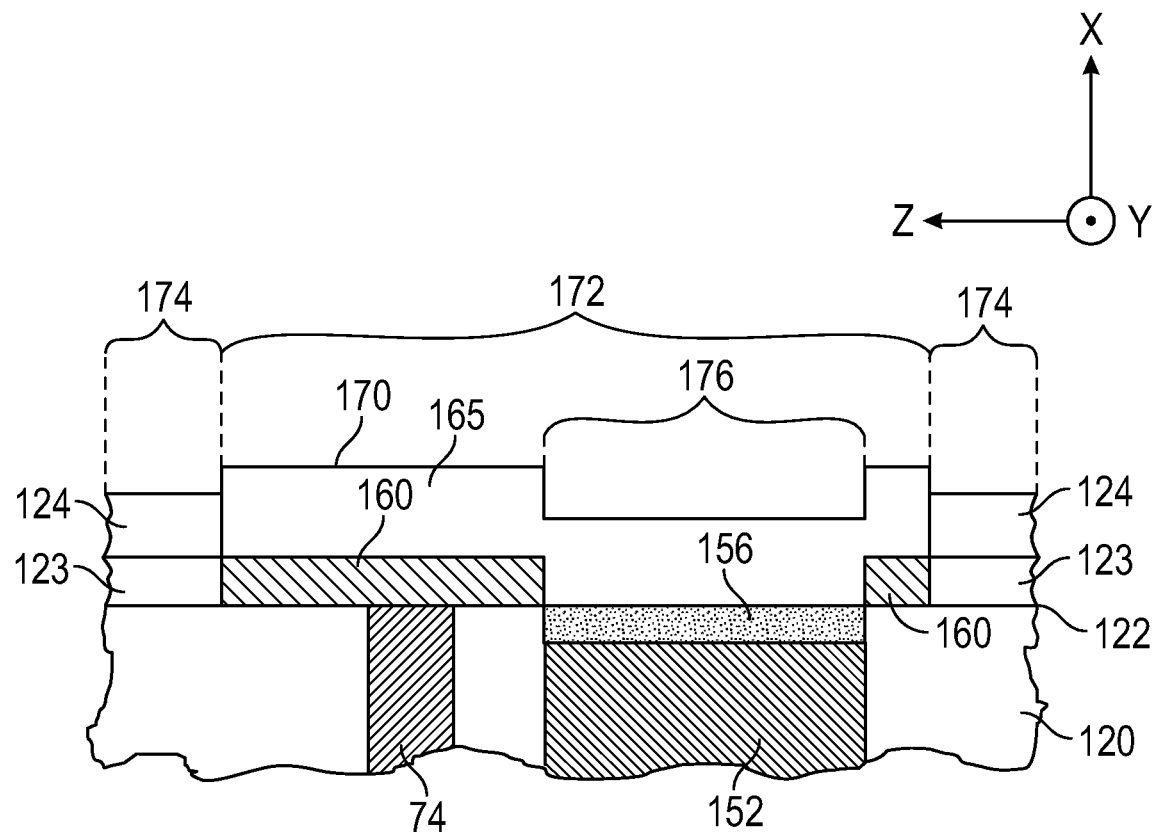

The silicon does not diffuse into the material of the NFT 74 or the surrounding slider 120 material (which is typically an alumina/titanium-carbide composite). The write pole end 156 will have a reduced magnetic moment due to the diffused silicon and a thickness substantially equal to the thickness of the silicon layer 160. It has been found that up to about 2.0 nm of silicon can diffuse into the ferromagnetic material of the write pole 152 to form the write pole end 156. In FIG. 5F a protective layer or overcoat, for example DLC, is deposited into the window region 172 to cover the write pole end 156 and the surrounding silicon layer 160. This results in a recessed portion 176 of second protective layer 165. In FIG. 5G, the resist 300 and layers above it have been removed, leaving the structure substantially as depicted in FIGS. 4A-4B. The contact pad 170 in the window region 172 has an outer surface that extends beyond the outer surface of protective layer 124 in the non-window region 174 The contact pad 170 has a recessed portion 176 covering the write pole end 156.

The method described in FIGS. 5A-5G avoids the problem of precise alignment of the photoresist mask to expose just the write pole. The mask does not need to be precisely aligned since the only requirement is that the deposited silicon covers the write pole. The diffused silicon protects the write pole, which is now recessed from the surrounding protective layer and will be protected during touchdown.

The method has been described for HAMR, so the window region has been depicted as including the NFT end in addition to the write pole end. This is because of the very close spacing of the NFT end to the write pole end, which makes it difficult to align the photoresist to expose just the write pole end. However, as mentioned, embodiments of the method are also applicable to PMR, in which case the window region would include only the write pole end and perhaps the write gap and a portion of the trailing shield. Thus for PMR, and its variations, it is sufficient if the contact pad covers only the write pole end.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A write head for writing to a magnetic recording layer of a medium, the write head comprising:
   a head carrier having a surface for facing the recording layer;
   a write pole on the head carrier, the write pole being formed of ferromagnetic material and having a silicon-containing portion with an end at the recording-layer-facing surface, the silicon-containing portion comprising ferromagnetic material and silicon; and
   a contact pad on a window region of the recording-layer-facing surface surrounding the write pole end, the contact pad comprising a layer consisting essentially of silicon, wherein the silicon layer does not cover the write pole end, and a protective layer on and in contact with the silicon layer and the write pole end, wherein the protective layer in contact with the write pole end is recessed from the outer surface of the contact pad.

2. The write head of claim 1 further comprising:
   an optical waveguide on the head carrier for receipt of laser radiation; and a near-field transducer (NFT) on the head carrier for optical coupling with the waveguide, the NFT having an output end at the recording-layer-facing surface; wherein the window region of the recording-layer-facing surface also surrounds the NFT output end and the silicon layer covers the NFT output end.

3. The head of claim 1 wherein the protective layer comprises diamond-like carbon (DLC).

4. The head of claim 1 further comprising an adhesion film in contact with the recording-layer-facing surface of the head carrier outside the window region, and a protective layer in contact with the adhesion film outside the window region.

5. The head of claim 4 wherein the protective layer outside the window region comprises diamond-like carbon (DLC).

6. The head of claim 4 wherein the outer surface of the protective layer of the contact pad extends beyond the outer surface of the protective layer outside the window region.

7. The head of claim 1 wherein the thickness of the silicon layer is between about 0.2 and 2.0 nm.

8. A magnetic recording disk drive comprising:
the head of claim 1;
a magnetoresistive read head on the head carrier; and
a magnetic recording disk having a magnetic recording layer.

9. A head for writing to data tracks on a magnetic recording layer of a disk in a heat-assisted magnetic recording (HAMR) disk drive, the head comprising:
a gas-bearing slider having a surface for facing the recording layer on the disk;
a write pole on the slider and having an end at the recording-layer-facing surface;
an optical waveguide on the slider for receipt of laser radiation;
a near-field transducer (NFT) on the slider for optical coupling with the waveguide, the NFT having an end at the recording-layer-facing surface;
wherein the recording-layer-facing surface of the slider comprises a window region surrounding the NFT end and write pole end and a non-window region;
a protective layer in the non-window region;
a contact pad on the recording-layer-facing surface in the window region, the contact pad comprising a layer consisting essentially of silicon on the recording-layer-facing surface, wherein the silicon covers the NFT end but not the write pole end, and a protective layer on and in contact with the silicon layer and the write pole end, wherein the protective layer in contact with the write pole end is recessed from the outer surface of the contact pad and the outer surface of the contact pad extends beyond the outer surface of the protective layer in the non-window region.

10. The HAMR head of claim 9 wherein the protective layer in the window and non-window regions comprises diamond-like carbon (DLC).

11. The HAMR head of claim 10 further comprising an adhesion film between the recording-layer-facing surface of the slider and the protective layer in the non-window region.

12. The HAMR head of claim 11 wherein the adhesion film comprises a silicon nitride.

13. The HAMR head of claim 9 wherein the thickness of the silicon layer is between about 0.2 and 2 nm.

14. A HAMR disk drive comprising:
the HAMR head of claim 9;
a magnetoresistive read head on the slider; and
a magnetic recording disk having a magnetic recording layer.

15. A method for forming a contact pad on a magnetic recording disk drive head carrier, the carrier having a disk-facing surface with a write pole of ferromagnetic material having an end at the disk-facing surface, the write pole end being surrounded by non-magnetic material at the disk-facing surface, the method comprising:
depositing a first protective layer on the disk-facing surface and covering the write pole end and its surrounding non-magnetic material;
forming a layer of photoresist on the first protective layer;
patterning the photoresist to expose a window region around the write pole end and its surrounding non-magnetic material;
etching the protective layer in the window region to expose the write pole end and its surrounding non-magnetic material;
depositing a layer of silicon in the window region covering the write pole end and its surrounding non-magnetic material to enable the silicon to diffuse into the ferromagnetic material of the write pole end;
depositing a second protective layer in the window region to cover the silicon layer and the write pole end of diffused silicon; and
removing the photoresist.

16. The method of claim 15 wherein depositing the first and second protective layers comprises depositing diamond-like carbon (DLC).

17. The method of claim 15 further comprising depositing an adhesion film selected from silicon and silicon nitride on the disk-facing surface and covering the write pole end and its surrounding non-magnetic material prior to depositing the first protective layer.

18. The method of claim 15 wherein depositing the silicon layer comprises depositing the silicon layer to a thickness between about 0.2 and 2.0 nm.

* * * * *